United States Patent [19]
Darcie et al.

[11] Patent Number: 5,483,369
[45] Date of Patent: Jan. 9, 1996

[54] COMMUNICATION SYSTEMS USING PASSIVE RF ROUTING

[75] Inventors: Thomas E. Darcie, Middletown; Ivan P. Kaminow, Holmdel; Dietrich Marcuse, Lincroft, all of N.J.

[73] Assignee: AT&T Corp., Murray Hill, N.J.

[21] Appl. No.: 147,652

[22] Filed: Nov. 3, 1993

[51] Int. Cl.[6] ........................................................ H02P 3/00
[52] U.S. Cl. .......................... 359/126; 333/133; 333/193; 310/313 R
[58] Field of Search ........................... 359/115, 117, 359/121, 124, 125, 126, 127, 128, 130, 131, 152; 385/4, 8, 11, 7, 14, 17, 24, 16, 37, 39, 46; 333/133, 193, 194, 195, 196; 310/313 R, 313 B, 313 C, 313 D

[56] References Cited

U.S. PATENT DOCUMENTS

| | | | |
|---|---|---|---|
| 3,942,140 | 3/1976 | Laker et al. | 333/133 |
| 4,639,695 | 1/1987 | Mariani et al. | 333/133 |
| 4,773,063 | 9/1988 | Hunsperger et al. | 370/3 |
| 4,947,073 | 8/1990 | Stokes et al. | 333/133 |
| 4,949,170 | 8/1990 | Yanagidaira et al. | 358/86 |
| 4,952,833 | 8/1990 | Nothnick | 333/133 |
| 5,002,350 | 3/1991 | Dragone | 350/96.15 |
| 5,054,873 | 10/1991 | Davis et al. | 385/27 |
| 5,136,671 | 8/1992 | Dragone | 385/46 |
| 5,278,687 | 1/1994 | Jannson et al. | 359/125 |

*Primary Examiner*—Hezron E. Williams
*Assistant Examiner*—Richard A. Moller

[57] ABSTRACT

Communication between an upstream point, such as a TV-source headend followed by a fiber optic line, and a number of downstream points, such as coaxial cable connected subscriber locations, is achieved by wavelength or frequency demultiplexing a spectrum of downstream radio-frequency signals with a surface-acoustic-wave (SAW) demultiplexer-multiplexer and distributing the demultiplexed signals to the downstream points, for example through the cables.

26 Claims, 5 Drawing Sheets

COMMUNICATION SYSTEMS USING PASSIVE RF ROUTING

RELATED APPLICATIONS

This application is related to the copending U.S. application Ser. No. 08/029724, filed Mar. 11, 1993, of T. E. Darcie, et al, and assigned to the same assignee as this application.

BACKGROUND OF THE INVENTION

This invention relates to methods and means for communicating between an upstream point and a number of downstream points, and particularly to communication systems starting at a source with optical fiber trunks and terminating at subscribers via coaxial cable distribution networks.

Fiber deployment in the trunk portion of distribution networks has resulted in a dramatic increase in options available to subscribers. Fiber feeders now end in nodes from which short coaxial cable distribution networks serve relatively small numbers of subscribers such as 100 to 2,000. Because the length of the coaxial cable in each case is less than approximately 1 to 2 kilometers, the effective available bandwidth is large, for example 1 GHz. This enhanced bandwidth allows a variety of services in addition to the conventional load of amplitude-modulation, vestigial-sideband, (AM-VSB) video channels. At present, fiber-coaxial systems broadcast substantially the same signals to each subscriber in the distribution plant. While this is fine for ordinary cable services, it fails to provide the privacy and security demanded for business, personal file transfers, pay video on demand, or special telephony. Privacy represents the inability of unintended listeners to eavesdrop. Security means that no rogue radio-frequency RF upstream transmitter can interrupt communication.

Copending U.S. application Ser. No. 08/029724, filed Mar. 11, 1993 discloses a passive optical network (PON) subscriber loop system that avoids this limitation by taking advantage of tunable lasers and wavelength selective routers. This arrangement furnishes a virtually private channel between the headend station and each user. However, it requires distribution with fiber optic lines directly to each subscriber. U.S. Pat. No. 5,136,671 discloses suitable optical router for this purpose.

An object of the invention is to furnish a system allowing a coaxial cable distribution network to limit information broadcast to each subscriber, whether or not such information is encrypted and whether or not such information is from an optical fiber trunk.

Another object of the invention is to furnish the equivalent of a private downstream and upstream channel, between a broadcast source and a subscriber, which is inaccessible to other users.

Yet another object of the invention is to furnish RF routers suitable for connection to fiber optic devices and for frequency division multiplexing and demultiplexing RF carriers.

SUMMARY OF THE INVENTION

According to a feature of the invention, communication between an upstream point, such as a TV source, and a number of downstream points, such as subscriber locations, is achieved by wavelength or frequency demultiplexing a spectrum of downstream radio-frequency signals with a surface-acoustic-wave (SAW) demultiplexer-multiplexer and distributing the demultiplexed signals to the downstream points.

According to another feature of the invention, upstream communication is achieved by multiplexing upstream signals from the downstream point with the surface-acoustic-wave (SAW) demultiplexer-multiplexer.

According to another feature of the invention, a multiplexer/demultiplexer, or router, converts a spectrum of RF subcarriers to acoustical waves in a crystal, directs the surface acoustic waves in the router from a first star coupler through an acoustic grating of unequal-length waveguides having outputs connected to a second acoustic star coupler with separate outputs, and converts the acoustical signals to electrical signals.

According to another feature of the invention, an optical receiver converts an optical carrier from a fiber optic source into a spectrum of electrical RF subcarriers, and to a surface acoustic wave router.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
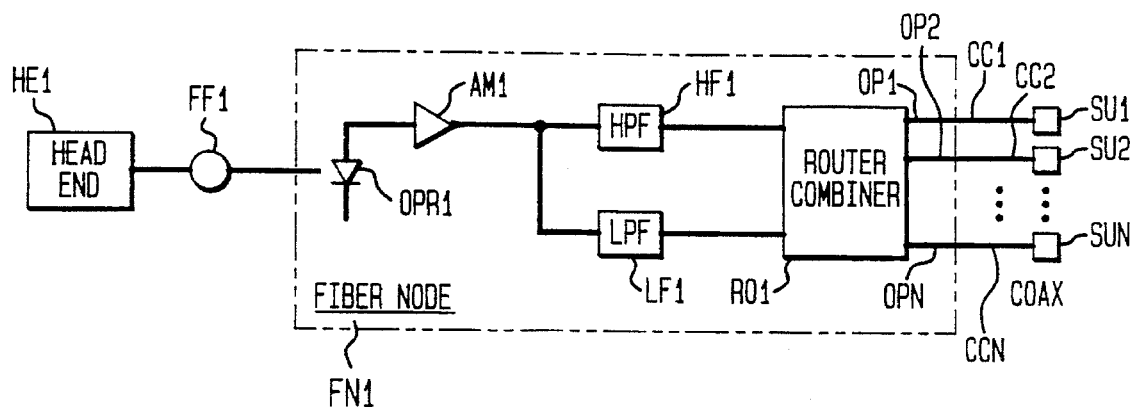
FIG. 1 is a block diagram of a system embodying features of the invention.

In FIG. 1, an optical fiber feeder FF1 conveys an optical carrier with a spectrum containing a number of radio-frequency (RF) subcarriers from a headend station HE1 to a number of fiber nodes FN1 of which one is shown. The fiber node FN1 includes an optical photodiode receiver OPR1 which detects or demodulates the spectrum of radio-frequency subcarriers and eliminates the optical carrier, and an amplifier AM1.

Figure 2:
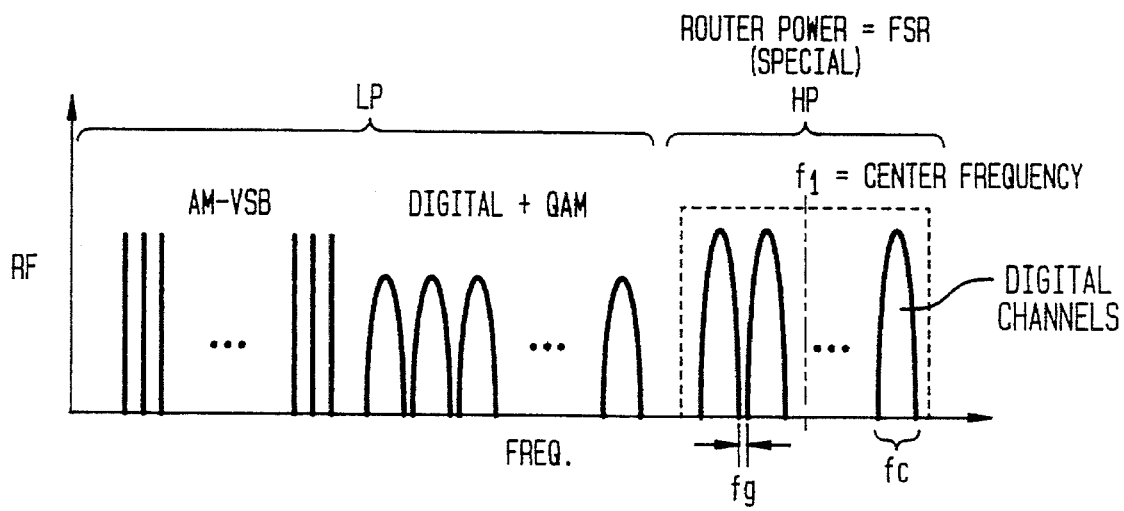
FIG. 2 shows the spectrum of bands transmitted in FIG. 1.

FIG. 2 illustrates a spectrum SP1 of subcarrier frequency-division bands which the headend station HE1 transmits on the optical fiber feeder FF1 to the fiber node FN1, and which appears at the output of the amplifier AM1 after detection by the optical photodiode receiver OPR1. Here, the spectrum SP1 includes amplitude-modulation, vestigial-sideband, (AM-VSB) video broadcast services, and digital and quadrature-amplitude-modulation (QAM) interactive services, in the low pass portion LP of the spectrum. The high pass portion HP of the spectrum SP1 includes special services with a different pair of subcarriers for each subscriber. The subcarriers in the low pass portion LP of the spectrum SP1 are intended for each subscriber. However a different pair of subcarriers in the high pass portion HP of the spectrum SP1 are destined independently for each particular subscriber.

In the node FN1 of FIG. 1, a high pass filter HF1 conveys the subcarriers in the high pass portion HP of the spectrum SP1 to a router RO1. The latter frequency-division demultiplexes the spectrum of subcarriers in the high pass portion HP of the spectrum SP1 into separate subcarriers. A different pair of subcarriers appears at each output port OP1 to OPN of router RO1. Two subcarriers occur at each port OP1 to OPN to permit downstream and upstream operation. A low pass filter LPF connects the subcarriers in the low pass portion LP of the spectrum SP1 directly, or through a broadcast star (not shown), to each of the output ports OP1 to OPN.

Coaxial cables CC1 to CCN at respective output port OP1 to OPN distribute the respective subcarriers to subscriber locations SU1, SU2, SU3, ... SUN. Each one of the cables CC1 to CCN delivers all of the subcarriers in the low pass portion LP of the spectrum SP1, but passes only two of the subcarriers in the high pass portion HP of the spectrum SP1 to the respective subscriber locations SU1 to SUN to which it is connected. Thus, the router RO1 selects two subcarriers in the high pass portion HP of the spectrum SP1 at the port PO1 and coaxial cable CC1 transmits them and all the subcarriers in the low pass portion LP to the subscriber SU1; the port PO2 passes another two subcarriers in the high pass portion HP of the spectrum SP1, and the cable CC2 passes them with all the subcarriers in the low pass portion LP to the subscriber SU2; the cable CC2 passes yet a third pair of subcarriers in the high pass portion HP of the spectrum SP1 with all the subcarriers in the low pass portion LP to the subscriber SU3, etc.

This coaxial-cable transmission of a pair of subcarriers in the high pass portion HP of the spectrum SP1 allows communication in the downstream and upstream directions. It permits transmission in the upstream direction through the cables CC1 to CCN, the fiber node FN1, and the fiber feed FF1 to the headend station HE1. The arrangement at each subscriber SU1 to SUN includes a transmitter and modulator to transmit the appropriate second subcarrier for the purpose of upstream communicating to the headend station HE1 of the data from the subscriber SU1. For example, if the viewer is a CATV subscriber, the latter can indicate to the headend station HE1 precisely what programming he or she wants or he or she can participate in a two-way multimedia session.

Figure 3:
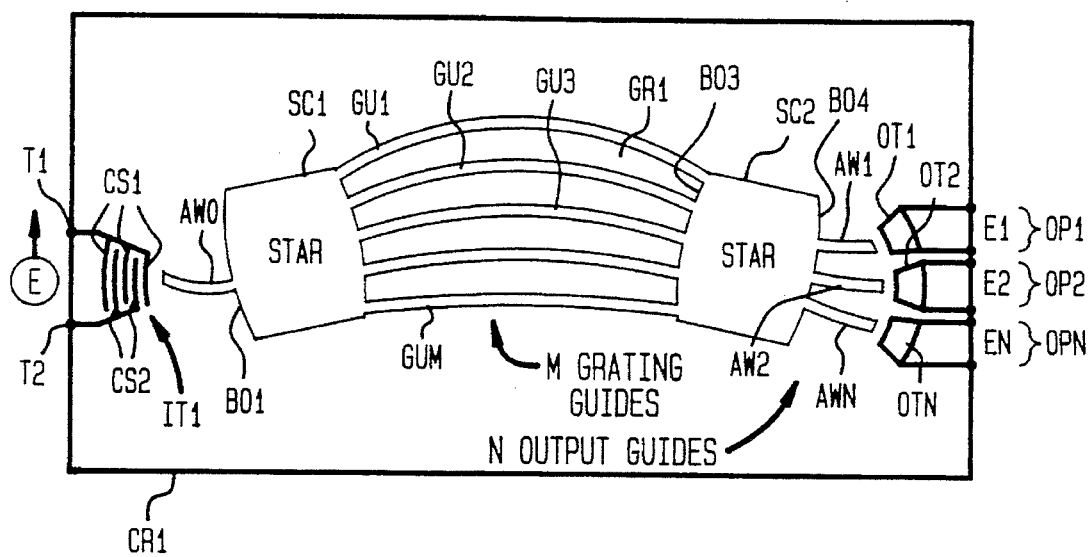
FIG. 3 is a schematic diagram of a surface acoustic wave (SAW) router in the system of FIG. 1 and embodying features of the invention.

FIG. 3 illustrates details of the router RO1, which is a 1×N router. Here a piezoelectric crystal CR1 supports a bidirectional interdigital transducer TR1 deposited on the crystal CR1. The crystal CR1 may for example be quartz or lithium niobate or any other piezoelectric material. In the transducer TR1 a first set of curved deposited conductors CS1 connected to one terminal T1 of the electrical input from the amplifier AM1. The conductor CS1 interdigitally alternate with a second set of conductors CS2 connected to the other terminal T2 of the input from the amplifier AM1. The transducer TR1 launches surface acoustic waves at radio frequencies f on the surface of the piezoelectric crystal CR1 at 1000 MHz or 109 Hz. The acoustic velocity v of the surface acoustic waves on the crystal CR1 is $3\times10^5$ centimeters per second. This results in a wavelength $\Lambda=v/f=3\times10^5/10^9=3\times10^{-4}$ centimeters=3 μm. The wavelength is of the same order of magnitude of optical wavelengths and the router RO1 may have a size corresponding to an optical router.

An acoustical waveguide AWO passes the waves through a 1×M star coupler SC1 to a waveguide grating GR1. The latter includes M metal waveguides GU1 to GUM having different lengths. The acoustical waveguide AWO, the star coupler SC1, and the waveguides GU1 to GUM are all in the form of metal deposits, preferably aluminum, on the surface of the crystal CR1. According to another embodiment, the acoustic waveguides are formed by diffusing titanium into lithium niobate in the regions surrounding the waveguide boundaries. The waveguides GU1 to GUM terminate in a second M×N star coupler SC2 having aluminum acoustical waveguide AW1 to AWN. N bidirectional output transducers OT1 to OTN facing each of the output paths change the acoustic waves to electrical signals El, E2, and EN along electrical conductor ports OP1 to OPN.

The metal deposited acoustical waveguides GU1 to GUM of respectively different lengths form the waveguide grating GR1 and the latter transmits different RF frequency bands at each of the ports OP1 to OPN. The star coupler SC1 forms a free space region, made of the same material as the acoustic waveguides GU1 to GUM, between two curved, preferably circular, boundaries BO1 and BO2. The input path AWO passes radially into the boundary BO1 of the star coupler SC1. The M waveguides GU1 to GUM form an array radially directed outward from the boundary BO2 toward a focal point F1. Each of the waveguides in the array has a width W and is separated from adjacent waveguides GU1 to GUM by an angular spacing of $\alpha'$.

The star coupler SC2 is of the same material as the star coupler CS1 and also serves as a free space region having two curved, preferably circular boundaries BO3 and BO4. The waveguides GU1 arrive at the free space region of star coupler SC2 in substantially uniform distribution along the boundary BO3. The waveguides AW1 to AWN leave the free space region of the stare coupler CS2 radially outward from the boundary BO4.

The length of each waveguide GU1 to GUM in the grating GR1 differs from the lengths of all other waveguides in the grating so as to effect predetermined and different phase shifts to the surface acoustic waves propagating into the waveguides of the grating from the star coupler SC1 to the star coupler SC2. The output of the waveguides GU1 to GUN thus exhibit different phases on the basis of the lengths of the waveguides. This results in different frequency bands appearing at the outputs OP1 to OPN. Each band contains only the desired subcarrier frequencies.

The structure of the router RO1 is determined by the frequency band that is routed as shown in FIG. 2. The routed band includes the high pass portion HP of the spectrum or free spectral range (FSR) of the router, the center frequency $f_1$ of the frequency band that is routed, the band width of the desired subcarrier channels $f_c$, the guard band $f_g$ between channels. As stated, at 1000 MHz, the acoustic velocity v of the surface acoustic waves on a quartz crystal CR1 is $3\times10^5$ cm/sec. This results in a wavelength of 3 μm.

For any desired center frequency $f_1$ such as 1000 $MH_z$, and any desired FSR such as 100 $MH_z$, we define a value $q=f_1/FSR$. In the router RO1, we assign the waveguides GU1 lengths $l_i$ which progressively decrease by a fixed amount $l=(l_i-l_{i-1})$. It is convenient to express l in terms of the number, q, of guide wavelengths $\Lambda$. Hence $$l=q(\Lambda)=q(v/f)$$

and $\Lambda=v/f$ where v is the velocity of propagation of the surface acoustic waves. If l=0, then, by symmetry, surface acoustic waves of any frequency f entering the input path or port AW0 would exist at the central output of the router. However, if l≠0, the light would exit at a different port as determined by l and f, due to the progressive phase delay $\phi=2\pi fl/v$ introduced by the waveguide array across the entrance to the output star.

Figure 4:
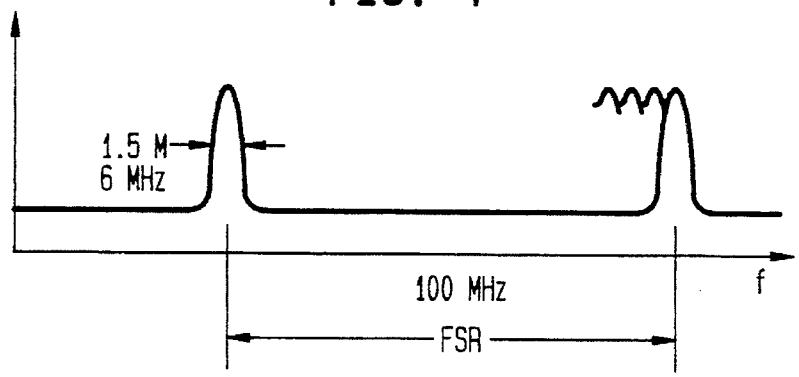
FIG. 4 shows a spectrum illustrating the transmission bands produced by a surface acoustic wave (SAW) router in FIG. 3.

The transmission function from the input port to a given output port is illustrated in FIG. 4. As f increases by v/l, $\phi$ increases by $2\pi$ and the transmission function repeats with period or free spectral range $$FSR=v/l=f/q$$

and the transmission peaks occur at f=qv/l, where q an integer at $\Lambda=3\mu$, $f=10^9$ Hz, and an FSR of $10^8$, q=10.

The resolution of the device, which operates as a generalized Mach-Zehnder interferometer or, alternatively, as a generalized grating of order q, is $$\delta f=FSR/M=f/qM,$$

where $\delta f$ is the minimum separation between adjacent channel peaks within a FSR. Adjacent channels can be accessed by incrementing by unity one of the M inputs to the input star or one of the M outputs of the output star.

The shape of the transmission function is given by the square of the Fourier transform of the series of excitation coefficients of the waveguide array as determined by the design of the input star. For example, uniform excitation, as produced by an ideal star, gives a $$\left(\frac{\sin x}{x}\right)^2$$

pattern, where $x=\pi f/\delta f$. The nearest side lobe at $x=3\pi/2$ has a level of −13 dB. The adjacent channel intersects the main lobe at $x=\pi/2$ at a level of −4 dB and has a null at x=0, the transmission peak. As in an antenna array, tapering the array excitation toward the edges can reduce the sidelobes significantly while increasing transmission peak width. If M<N, then adjacent channels are separated by $$f_c=FSR/N=(M/N)\delta f.$$

and the cross-talk near the center of a passband, as determined by the sidelobes from adjacent channels, is reduced compared with M=N.

For a center frequency f=1000 MHz, a router band FSR=100 MHz, a channel band $f_c$=1.5 MHz, and a guard band $f_g=f_c$ to $2f_c$, $q=f_1/FSR=10^9/10^8=10$ $l=q\sigma\sim10\times3=30$ μm, $M=FSR/\delta f$, $\delta f\sim f_c$, hence $M=FSR/f_c=10^8/1.5\times10^6=67$ for a 3 db overlap as shown in the frequency-transmission diagram FIG. 4. Hence, the free spectral range FSR contains up to 67 channels.

For good crosstalk performance, N=M/3 so that only one in three channels is used. The resulting number is 67/3~22 channels.

For a 6 MHz channel band $f_c$, $M=FSR/f_c=10^8/6\times10^6=17$, N=M/3~17/3~5.

Figure 5:
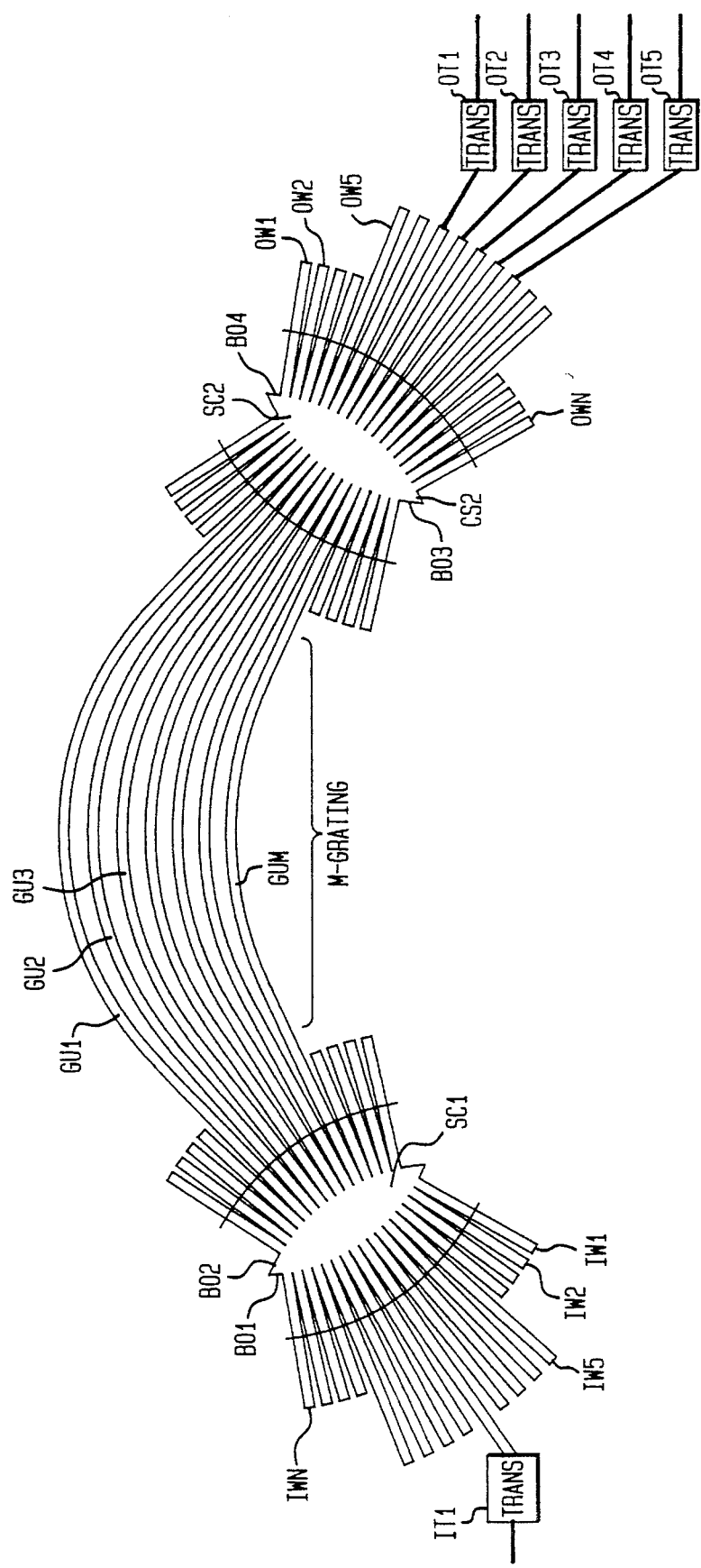
FIG. 5 is a diagram of an NXN router for use in FIG. 1 and embodying features of the invention.

According to an embodiment of the invention, N=M/2. For a 500 MHz free spectral range FSR, and $f_c$=1.5 MHz $q=f_1/FSR=10^9/5\times10^8=2$ $l=q\sigma/n\sim2\times3=6$ μm $M\sim FSR/f_c=5\times10^8/1.5\times10^6=330$ $N=M/3=110$ For FSR=500 MHz and $f_c$=6 MHz $M\sim5\times10^8/6\times10^6=83$ $N\sim M/3=28$ Although a 1×N router appears in FIG. 3, it is possible to use one input and selected outputs of an N×N router as shown in FIG. 5. Here, elements corresponding to the same elements in FIG. 3 exhibit the same reference characters. However, input waveguides to the router are identified as IW1 to IWN and output waveguides to the router are identified as OW1 to OWN.

Figure 6:
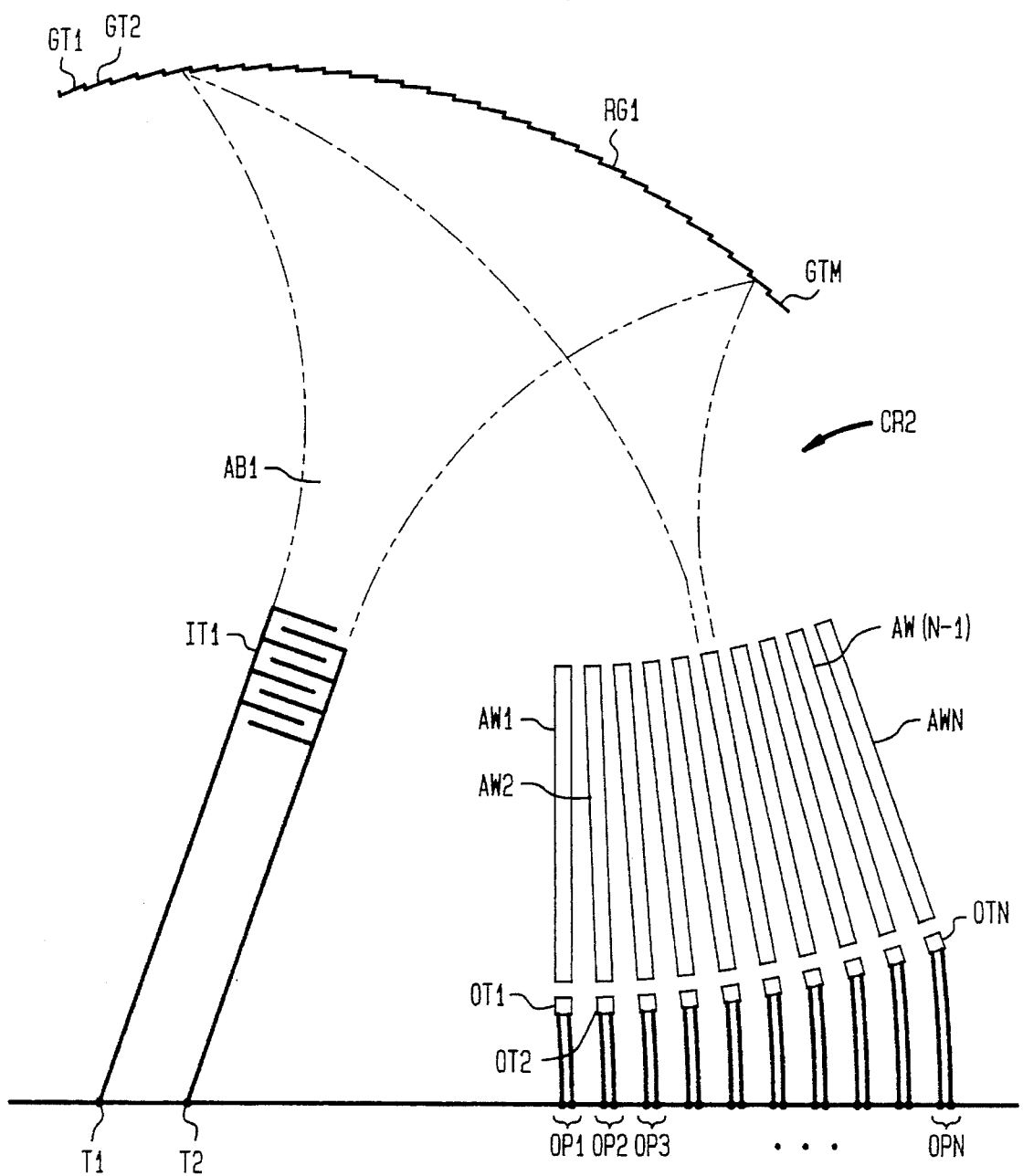
FIG. 6 is a diagram of a diffraction-grating SAW router for use in the system of FIG. 1 and embodying features of the invention.

Another router RO2 embodying the invention and for use in the arrangement of FIG. 1 appears in FIG. 6. Router RO2 takes advantage of the fact that acoustical waves can be reflected very easily at interfaces between a solid material and air. It reduces the length of the router by half simply by reflecting the waves at a plane midway along the waveguide array. It also simplifies the construction dramatically by eliminating the waveguide grating and replacing it with a "free space" acoustic reflection grating cut as a properly shaped groove into the surface of the piezoelectric crystal.

Figure 7:
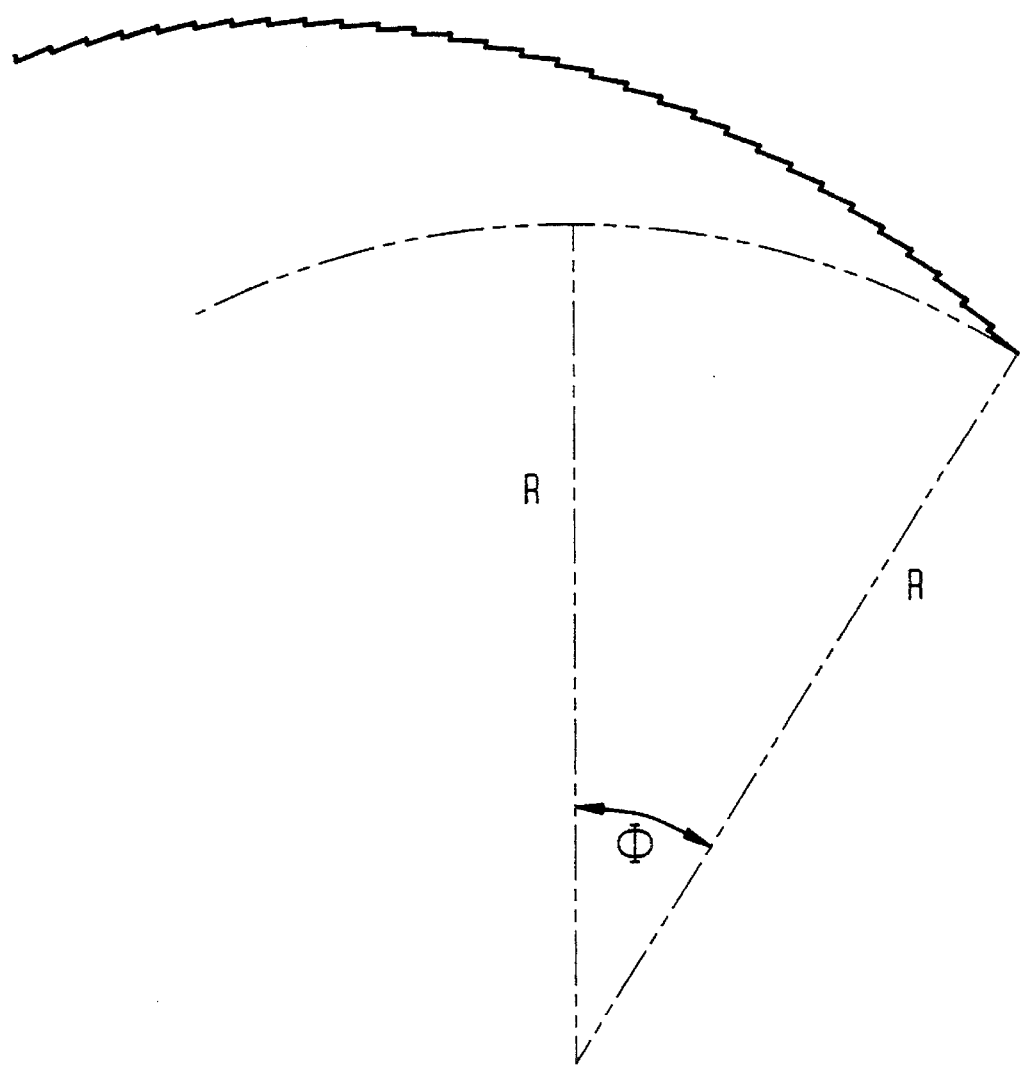
FIG. 7 is an explanatory diagram illustrating the structure of the router in FIG. 6.

In FIG. 6 elements corresponding to those of FIG. 3 have the same reference characters. In FIG. 7 a grating GR2 located on the surface of a Y-cut $LiNbO_3$ piezoelectric crystal CR2, is approximately 1 by 1 cm (which, of course, depends on the frequency at which the device is intended to operate). An interdigital launching transducer IT1 corresponding to the transducer IT1 in FIG. 1, and the acoustical waveguides AW1 to AWN are composed of thin metal stripes deposited on the crystal CR2. The purpose of the metalization is different in the two cases. In case of the transducer IT1, the metal fingers are connected to input terminals T and T2 which excites an acoustical Rayleigh surface wave. The metalization, defining the waveguides AW1 to AWN, has the effect of slowing the Rayleigh wave so that it can be trapped under the thin metal layers. Slowing of the Rayleigh wave by metalization of the surface has the same effect as creating a dielectric optical waveguide by raising the dielectric constant of an optical medium in a narrow stripe.

According to one embodiment of the invention, the reflected waves could be collected by interdigital transducers. However, since it is desirable to focus the beam to as narrow a spot as possible to increase the resolution, the receiving transducers would have to be spaced so closely that they might become impractical and inefficient. For this reason, the embodiment of FIG. 6 collects the sound into waveguides AW1 to AWN that are allowed to fan out so that the sound can be detected by separate transducers OT1 to OTN that are placed at the end of every third waveguide to limit cross-talk. According to another embodiment of the invention, the transducers are placed at the end of every second or fourth waveguide. According to an embodiment of the invention, the acoustic wave is detected by segmentation of the waveguides themselves, which serve the dual purpose of collecting and detecting the waves.

The blazed reflection grating RG1 of FIG. 6 is a (jagged) groove etched or ion-milled into the crystal surface of crystal CR1. The size of the grating teeth GT1 to GTM is shown exaggerated in FIG. 6. In an actual device the teeth could not be seen on the scale of this figure. The interdigital transducer IT1 aims an acoustical beam AB1 at the grating which, after reflection, is focused onto the ends of the acoustical waveguides that are intended to collect the wave.

On an isotropic surface the shape of the grating is defined as shown in FIG. 7. We define a circular arc with radius R as the nominal concave mirror for reflecting and focusing the incoming wave. The length of the arc is $$S = 2\phi R$$

to obtain the diffraction grating RG1 rather than a simple concave mirror, we subdivide the arc into M segments of angular width $$\Delta\phi = \frac{2\phi}{M}$$

and, beginning at the right end of the circular arc, we draw a segment of the grating by progressing a distance $$\Delta S = R\Delta\phi$$

along the arc. Before drawing the next segment, we advance the radius by an amount that is defined by the requirement that the wave, traveling the additional distance $2\Delta R$ into and out of the grating, suffers a phase shift of $2\pi q$, where q=F/FSR.

$$2\Delta Rk = 2\pi q$$

This criterion results in $$\Delta R = \frac{\pi q}{k}$$

where k is the propagation constant of the wave with frequency $f_o$ and phase velocity v, $$k = \frac{2\pi f_o}{v}$$

Using the new radius, $R+\Delta R$, we draw the next segment of length $\Delta S = Rd\phi$. This process continues until the desired grating has been produced with M teeth. The integer q in (4) defines the grating order.

As defined, the grating reflects the wave at frequency $f_o$ in the same way as the nominal concave mirror (if we neglect effects caused by the walk-off of the mirror surface due to the grating steps). However, when the frequency is changed by an amount $\Delta f$, the reflected beam changes direction by an angle $$\psi = \arcsin\left(\frac{mv\Delta f}{f_o(f_o + \Delta f)\Delta S}\right)$$

which is computed from the requirement that after reflection, the wave components belonging to the same plane wave front must be in-phase within a multiple of $2\pi$.

A grating produces several refracted main lobes. At the design frequency $f_o$ the central lobe emerges as though it were reflected from the nominal (concave) mirror. But at the same time additional main lobes are created to either side of the principal grating response. As the frequency is changed, the central grating lobe moves off into a new direction $\psi$ while the nearest main lobe approaches its original position.

According to the invention the headend station HE1 transmits a specific different subcarrier to each subscriber SU1 to SUN. The headend station can then modulate the carrier to that subscriber on the basis of the request made by the subscriber over the companion subcarrier in the cables CC1 to CCN. The invention provides virtually a private channel between the headend station and the subscriber over an optical fiber or cable distribution system. The invention need not be used with optical fiber trunks but may be used in systems that use cable alone.

According to another embodiment of the invention, two or more headend stations connect to respective transducers each at a different one of input waveguides IW1 to IWN of the N×N router of FIG. 5. Output waveguides OW1 to OWN connect to respective transducers which in turn connect to subscriber locations. Each headend station communicates with subscribers at particular ones of the output waveguides OW1 to OWN by selecting the specific subcarrier frequencies suitable for those particular output waveguides. A specific set of subcarriers at one input waveguide communicates with one set of output waveguides, and the same set of subcarriers at a different input waveguide appear as outputs on different output waveguides. A geometrical shift of a spectrum clockwise to an adjacent input waveguide shifts the output subcarriers of that spectrum to counter-clockwise along adjacent output waveguides.

According to another embodiment, two users are connected to separate input waveguides and to separate output waveguides of the router. The first user transmits over a subcarrier frequency that produces an output at the router's output waveguide of the second user. Similarly, the second user then receives the data and in turn transmits into its input waveguide of the router over a subcarrier frequency that produces an output at the router's output waveguide of the first user. Similarly, numbers of users connected to different input and output waveguides of the router communicate among themselves by selecting specific operating subcarrier frequencies suitable to the intended connection.

While embodiments of the invention have been described in detail, it will be evident to those skilled in the art that the invention may be embodied otherwise without departing from its spirit and scope. For example, according to other embodiments of the invention, the crystals CR1 and CR2 may be replaced with piezoelectric materials other than those disclosed, for example ceramic piezoelectric materials. Furthermore, the low pass portion of the spectrum may pass through the router rather than directly to the output ports OP1 to OPN. Also, the transmission arrangement at the subscriber SU1 to SUP may use only a modulator which modulates incoming signals from the headend and returns the signals to the headend.

What is claimed is:

1. A system for communicating between a radio-frequency signal upstream point arranged for operating over a radio-frequency spectrum and a plurality of radio-frequency signal downstream points each arranged for operating over a specified portion of the radio-frequency spectrum, comprising:

a radio-frequency signal electrical upstream lead coupled to the radio frequency signal upstream point;

a plurality of radio-frequency signal electrical downstream leads each connected to a radio-frequency signal downstream point;

a surface-acoustic-wave (SAW) demultiplexer-multiplexer connecting said radio-frequency signal electrical upstream lead to said plurality of radio-frequency signal electrical downstream leads;

said surface-acoustic-wave demultiplexer-multiplexer including a wavelength-separating acoustic wavelength array having a plurality of unequal-length waveguides such that different frequency bands appear at each of said leads.

2. A system as in claim 1, wherein said wavelength-separating acoustic wavelength array having the plurality of unequal-length waveguides is such that different progressive phase shifts are imparted to the surface acoustic waves.

3. A system as in claim 1, wherein said surface-acoustic-wave demultiplexer-multiplexer includes:

a surface acoustic wave (SAW) supporting piezoelectric material;

said plurality of unequal length waveguides deposited on said piezoelectric material and forming the wavelength array having upstream ends and downstream ends;

an electrical SAW upstream transducer deposited on said piezoelectric material and connected to said radio-frequency signal electrical upstream lead;

an upstream coupler deposited on said piezoelectric material and coupling the upstream transducer to the upstream ends of the waveguides;

an electrical SAW downstream transducer deposited on said crystal and connected to said radio-frequency signal electrical downstream leads; and a downstream coupler deposited on said crystal and coupling the downstream transducer to the downstream ends of the waveguides.

4. A system as in claim 3, wherein said upstream coupler is an acoustic star coupler, and said downstream coupler is a star coupler.

5. A system as in claim 3, wherein said piezoelectric material is a crystal.

6. A system as in claim 5, wherein said crystal is lithium niobate.

7. A system as in claim 5, wherein said crystal is quartz.

8. A system as in claim 3, wherein said waveguides are conductors on the surface of said piezoelectric material.

9. A system as in claim 3, wherein each of said waveguides in the grating differs in length from the lengths of all other waveguides in the grating so as to impart predetermined and different progressive phase shifts to the surface acoustic waves.

10. A system as in claim 3, wherein said upstream and downstream couplers are star couplers.

11. A system as in claim 1, further comprising an optical fiber operating over an optical range including modulation of the radio-frequency spectrum and a demodulator for applying the radio-frequency spectrum to the radio-frequency signal electrical upstream lead.

12. A system as in claim 1, wherein the SAW demultiplexer-multiplexer includes:

a crystal;

a blazed grating structure in said crystal having a given number of blazings; a launching acoustical transducer on the crystal directed toward the grating structure;

a plurality of metal receiving paths on said structure; and an acoustical detector for each of a selected one of said paths.

13. A method for communicating between a radio-frequency signal upstream point arranged for operating over a radio-frequency signal spectrum and a plurality of radio-frequency signal downstream points each arranged for operating over a specified portion of the radio-frequency spectrum, comprising:

passing signals covering a spectrum of radio frequencies between the radio-frequency signal upstream point and a radio-frequency signal electrical upstream lead;

passing specified portions of the radio-frequency spectrum between a plurality of radio-frequency signal electrical downstream leads and the plurality of radio-frequency signal downstream points; and multiplexing-demultiplexing signals in the radio-frequency spectrum and portions of the radio-frequency spectrum with a surface-acoustic-wave wavelength demultiplexer-multiplexer connecting said radio-frequency signal electrical upstream lead to said plurality of radio-frequency signal electrical downstream leads;

said demultiplexing-multiplexing step including establishing surface acoustic waves (SAWs) on a surface acoustic wave (SAW) supporting material from said radio-frequency signal electrical upstream lead and to said downstream leads;

forming interferences between the SAWs with a wavelength-separating array of a plurality unequal length waveguides such that different frequency bands appear at each of said downstream leads.

14. A method as in claim 13, wherein said demultiplexing-multiplexing step includes:

establishing the surface acoustic waves (SAWs) with an electrical SAW upstream transducer on a surface acoustic wave (SAW) supporting crystal and connected to said radio-frequency signal electrical upstream lead;

forming the interferences between the SAWs with the wavelength array of a plurality of unequal length waveguides at upstream ends and downstream ends;

said interference forming step including coupling the SAWs from the upstream transducer to the waveguides through an upstream coupler and coupling the signals at the downstream ends of the waveguides to a downstream coupler; and transducing the SAWs at the downstream ends of the waveguides with an electrical SAW downstream transducer connected to said radio-frequency signal electrical downstream leads.

15. A method as in claim 14, wherein said coupling with said upstream coupler uses an acoustic star coupler, and said coupling step with said downstream coupler uses a star coupler.

16. A method as in claim 13, wherein said interference forming step includes imparting predetermined and different phase shifts to the surface acoustic waves by passing the surface acoustic waves through the waveguides over different paths each of which has a length which differs in length from the lengths of all other waveguides in the wavelength array.

17. A method as in claim 14, wherein said coupling steps include passing the SAWs through star couplers forming free space regions.

18. A method as in claim 13, wherein said passing step includes propagating the radio-frequency spectrum as a subcarrier in an optical signal over an optical fiber operating over an optical range including the radio-frequency spectrum and demodulating the optical signal to apply the radio-frequency spectrum to the radio-frequency signal electrical upstream lead.

19. A router for routing radio frequency signals between a radio-frequency signal upstream point and a plurality of radio-frequency signal downstream points, comprising:

a surface acoustic wave (SAW) supporting material;

an electrical SAW upstream transducer deposited on said material at the radio-frequency signal upstream point;

a SAW upstream coupler coupled to the upstream transducer;

a electrical-SAW downstream transducer deposited on said material at the radio-frequency signal downstream points;

a SAW downstream coupler coupled to said downstream transducer; and a plurality of unequal length acoustic paths forming an acoustic wavelength array having upstream ends coupled to said SAW upstream coupler and downstream ends coupled to said SAW downstream coupler such that different frequency bands appear at each of said downstream leads.

20. A router as in claim 19, wherein said SAW upstream coupler is an acoustic star coupler, and said SAW downstream coupler is an acoustic star coupler.

21. A router as in claim 19, wherein said material is a piezoelectric material.

22. A router as in claim 19, wherein said material is a crystal.

23. A router as in claim 19, wherein said material is a quartz crystal.

24. A router as in claim 19, wherein said material is lithium niobate.

25. A router as in claim 19, wherein said plurality of acoustical waveguides of different lengths each extending between an upstream and a downstream end.

26. A router as in claim 19, wherein said grating includes a plurality of grating blazings along a curved path at unequal distances from a first position at said SAW upstream coupler and at given distances from said SAW downstream coupler.

* * * * *